(12) United States Patent
Czwaluk et al.

(10) Patent No.: US 9,162,411 B2
(45) Date of Patent: *Oct. 20, 2015

(54) SCREW SEPARATOR

(75) Inventors: Andreas Czwaluk, Vechta (DE); Matthias Rabener, Oelde (DE)

(73) Assignee: UTS Biogastechnik GmbH, Hallbergmoos (DE)

( * ) Notice: Subject to any disclaimer, the term of this patent is extended or adjusted under 35 U.S.C. 154(b) by 551 days.

This patent is subject to a terminal disclaimer.

(21) Appl. No.: 12/704,102

(22) Filed: Feb. 11, 2010

(65) Prior Publication Data

US 2011/0186499 A1 Aug. 4, 2011

(30) Foreign Application Priority Data

Feb. 2, 2010 (DE) .......................... 20 2010 001 758

(51) Int. Cl.

| | |
|---|---|
| *B30B 9/00* | (2006.01) |
| *B01D 25/00* | (2006.01) |
| *B01D 29/00* | (2006.01) |
| *B01D 35/00* | (2006.01) |
| *B01D 33/00* | (2006.01) |
| *B01D 36/02* | (2006.01) |
| *B01D 35/22* | (2006.01) |
| *B01D 33/03* | (2006.01) |
| *B01D 25/32* | (2006.01) |
| *B01D 33/58* | (2006.01) |
| *B30B 9/12* | (2006.01) |
| *B30B 9/18* | (2006.01) |
| *B30B 9/26* | (2006.01) |
| *B01D 35/12* | (2006.01) |
| *B01D 35/16* | (2006.01) |
| *B01D 33/41* | (2006.01) |
| *B01D 33/64* | (2006.01) |
| *B01D 33/76* | (2006.01) |
| *B01D 29/94* | (2006.01) |
| *B01D 29/82* | (2006.01) |

(52) U.S. Cl.
CPC ... *B30B 9/12* (2013.01); *B30B 9/18* (2013.01); *B30B 9/26* (2013.01); *B01D 29/828* (2013.01); *B01D 29/94* (2013.01); *B01D 33/41* (2013.01); *B01D 33/648* (2013.01); *B01D 33/76* (2013.01)

(58) Field of Classification Search
USPC .................................. 210/413, 415; 100/117
See application file for complete search history.

(56) References Cited

U.S. PATENT DOCUMENTS

| | | |
|---|---|---|
| 631,072 A | 8/1899 | Grosse |
| 647,354 A | 4/1900 | Anderson |
| 2,215,944 A | 4/1947 | Vincent |
| 2,471,363 A | 5/1949 | Vincent et al. |
| 2,536,240 A | 1/1951 | Vincent |
| 3,003,412 A | 10/1961 | Vincent |
| 3,235,087 A | 2/1966 | Andrews et al. |
| 3,585,924 A * | 6/1971 | Nolan .............................. 100/43 |
| 3,672,641 A | 6/1972 | Slaby |
| 3,938,434 A * | 2/1976 | Cox ............................... 100/117 |

(Continued)

*Primary Examiner* — Nam Nguyen
*Assistant Examiner* — Clare Perrin
(74) *Attorney, Agent, or Firm* — Greer, Burns & Crain, Ltd.

(57) ABSTRACT

A screw separator for separating solids out of suspensions, having at least one housing and at least one feed pipe for the suspension, at least one discharge pipe for liquids, and at least one outlet for the at least partially dewatered solids. At least one strainer basket is provided in the housing in which a screw is rotatably mounted, and the screw vanes terminate in a replaceable wearing ring mounted downstream of the strainer basket.

20 Claims, 4 Drawing Sheets

(56) References Cited

U.S. PATENT DOCUMENTS

| | | |
|---|---|---|
| 4,018,899 A | 4/1977 | Seckler et al. |
| 4,132,845 A | 1/1979 | Covington, Jr. et al. |
| 4,200,537 A | 4/1980 | Lamort |
| 4,214,377 A | 7/1980 | Maffet |
| 4,228,005 A | 10/1980 | Covington, Jr. et al. |
| 4,260,488 A | 4/1981 | Condolios |
| 4,291,619 A * | 9/1981 | Hunt et al. ............... 100/43 |
| 4,309,291 A | 1/1982 | Probstein et al. |
| 4,347,134 A | 8/1982 | Svehaug |
| 4,358,371 A | 11/1982 | Jameson et al. |
| 4,520,724 A | 6/1985 | Costarelli |
| 4,818,403 A | 4/1989 | Nagaoka |
| 4,915,830 A | 4/1990 | Mackay et al. |
| 4,941,404 A | 7/1990 | Tegtmeyer |
| 4,997,578 A | 3/1991 | Berggren |
| 5,009,795 A | 4/1991 | Eichler |
| 5,012,731 A * | 5/1991 | Maisonneuve ............ 100/110 |
| 5,118,427 A * | 6/1992 | Eichler .................... 210/748.01 |
| 5,526,740 A * | 6/1996 | Lee ........................... 100/112 |
| 5,665,232 A * | 9/1997 | Schlegel .................. 210/408 |
| 5,697,702 A | 12/1997 | Triassi et al. |
| 5,833,851 A * | 11/1998 | Adams et al. ........... 210/413 |
| 6,550,376 B2 | 4/2003 | Johnston |
| 6,634,508 B1 * | 10/2003 | Ishigaki .................. 210/415 |
| 8,151,702 B2 * | 4/2012 | Marchesini ............. 100/117 |
| 2001/0030107 A1 | 10/2001 | Simpson |
| 2003/0015465 A1 * | 1/2003 | Fick et al. ............... 210/234 |
| 2005/0172837 A1 * | 8/2005 | Flor ......................... 100/117 |
| 2006/0138054 A1 * | 6/2006 | Menke et al. ........... 210/703 |
| 2009/0211467 A1 * | 8/2009 | Flor ......................... 100/125 |

\* cited by examiner

Fig. 8

# SCREW SEPARATOR

BACKGROUND

The present invention relates to a screw separator or a screw press separator for separating solids out of suspensions, the screw separator comprising a housing having a suspension feed pipe, a liquids discharge, and an outlet for the at least partially dewatered solids. These screw separators, often called filter screw presses, are per se known from the prior art.

For example a screw press separator for dewatering solids suspended in water has become known from EP 0 367 037 B1 comprising in a housing a feed pipe to the water to be separated, a discharge pipe for the separated water, and a mouth for the dewatered solid matter. To this end the housing is provided with a strainer basket in which a press screw is arranged. The worm shaft of the press screw protrudes beyond the end of the mouthpiece. In the region of the strainer basket the worm shaft comprises a helical screw or a screw vane the edges of which are positioned close to the inner face of the strainer basket to enable efficient dewatering.

In this known screw press separator a slug forms in front of the mouth during operation and is urged out of the mouth of the screw press separator as a dewatered slug while the solids-free water emerges from the strainer basket, leaving the screw press separator housing. At the same time the slug keeps building up from the solids sediment. To prevent the water from spurting through, a narrow gap must be maintained between the radially outwardly edge of the screw vanes and the strainer basket.

The known screw press separator is reliable in operation. There is the drawback, however, that due to the high stresses the strainer basket must be inspected and possibly replaced on a regular basis.

It is therefore the object of the present invention to provide a screw separator for separating solids out of suspensions which is subjected to reduced wear.

SUMMARY

The screw separator according to the invention for separating solids out of suspensions comprises in a first embodiment at least one housing having at least one suspension feed pipe, at least one discharge for the separated liquid, and at least one outlet for the at least partially dewatered solids. The housing is provided with at least one strainer basket in which a screw is rotatably arranged. The screw vanes terminate in a replaceable wearing ring mounted downstream of the strainer basket.

The screw separator of the invention has many advantages. It is a significant advantage of the screw separator according to the invention that the screw vanes of the screw do not terminate in the strainer basket but in a replaceable wearing ring mounted downstream of the strainer basket. The wearing ring may be configured as a simple ring. The particular advantage of such a ring or wearing ring is that it is mounted in the region of the axial end of the screw vanes where stresses are particularly high due to the high pressure prevailing here. Experience shows that at this point wear to the screw vanes and to the adjacent strainer basket is highest. The wearing ring is readily replaceable as needed. The service life of the strainer basket is significantly extended compared to the prior art.

As a rule the strainer basket consists of a filter with rods in defined dimensions and spacing which is complicated to manufacture. The screw vanes in turn tend to be provided with a special coating to increase durability. Regular replacement and regular inspection are still required though.

Also, the screw vanes are subjected to reduced stresses by the construction according to the invention so as to achieve increased durability.

Preferably the screw vanes are armor-coated e.g. by tungsten carbide or other alloys or hard metals to enable a long service life even when employing abrasive separation agents.

By means of the construction according to the invention in which the screw vanes do not terminate in the region of the strainer basket but protrude beyond the edge of the strainer basket in the axial direction terminating in a separate wearing ring, the durability of the strainer basket is considerably increased. The wearing ring may consist for example of a soft material or plastic or wood, thus in the case of particularly high loads being able to deflect away from the screw vanes by way of slight elastic deformation so as to achieve increased durability even when plastic materials are employed. Wearing rings of metal or other materials are likewise conceivable. Even if the durability of the wearing ring should be less than that of the strainer basket in a conventional screw press separator, replacement of the ring in the construction according to the invention is simple and cost-effective. The technical and financial efforts involved are comparatively minor.

In preferred configurations at least one press basket is mounted downstream of the strainer basket with the replaceable wearing ring mounted between the strainer basket and the press basket.

The wearing ring is configured to be tight in particular in the radial direction. It is likewise conceivable for it to contain small apertures to allow certain quantities of water or the like to escape.

At this point reference is made to that the term "suspension" is in particular understood to mean an aqueous solution or a hydrous mixture containing solids or solid particles. The liquid may be water containing fibers, tissue or the like, or it may be any other liquid.

A screw separator according to the invention may be employed for example for separating structural, fibrous suspensions and sludge such as liquid manure, digestate, slops, slaughter waste, rejects, and waste water. Employment is possible as well in the meat-processing industry, in the paper and cellulose industry, in plastic recycling, in the wood-processing industry, and in the food-processing industry and in similar industrial branches.

In simple configurations the wearing ring is configured as a hollow cylindrical element. Or else it may be conically tapering or widening.

In preferred configurations the screw is supported on one side only. Preferably the screw is supported on the feeder side so as to have a free end towards the outlet. Preferably the screw is guided at its free end. This means that a guide is in particular provided which restricts the possible radial swing of the end of the worm shaft. A ball bearing, slide bearing or the like may be provided.

In advantageous more specific embodiments the outlet is provided with at least one ejection controller to limit ejection of the solids compacted to form a slug, thus furthering slug formation. The ejection controller may comprise or be provided as a flap cover mechanism which cover mechanism is biased in the closed position to ensure slug formation.

The flap cover mechanism preferably comprises three cover sections distributed over the circumference. Employing two or four or more cover sections is possible as well. Employing three or more cover sections will achieve a homogeneous compaction over the circumference. The screw may comprise one, or two or more screw flights.

In preferred embodiments the strainer basket is retained in the housing radially floating. For example the radial displaceability of the strainer basket in the housing is up to 2, 3, or even 6 mm. In this way the strainer basket is allowed to precisely adjust to the position of the screw. Any manufacturing tolerances and in particular hard lumps in the suspension will not cause blocking of the screw separator but in case of stresses the strainer basket can radially deflect accordingly.

To ensure reliable slug formation the inner diameter of the strainer basket is adapted to the outer diameter of the screw or the screw vane. What is in particular provided is a defined and preferably narrow radial gap between the screw vane and the strainer basket. The radial gap width is less than 2 mm and in particular less than 1 mm, in preferred embodiments lying in a range less than 0.7 mm and particularly preferably less than 0.5 mm. Expressed in percentages, the gap width is in particular less than 1% of the outer screw vane diameter and in particular less than 0.5% of the outer screw vane diameter. In preferred embodiments the gap width may be between approximately 0.05 and 0.2% of the outer screw vane diameter.

Preferably the housing is provided with at least one inspection hole to be opened and/or closed by way of at least one quick release.

In particularly preferred configurations at least one inspection hole is provided with a transparent inspection glass. This allows looking into the housing interior from the exterior during operation. Since as a rule there is ambient pressure external of the strainer basket or the press basket, a plastic window or safety glass is sufficient for the transparent inspection glass.

Preferably at least one drive is provided. The drive is in particular mounted on the side of the feeder region and it may be connected with the worm shaft via a transmission or the like for driving the worm shaft. The drive may be configured as an electric motor or else as a hydraulic motor or some other motor.

In other configurations it is preferred for the press basket to be radially fixed. In this way a defined position of the press basket is achieved.

The strainer basket and/or the press basket may be retained axially floating. Preferably the strainer basket is retained axially floating and the press basket, axially fixed.

Preferably the inner diameter of the press basket is larger than the inner diameter of the strainer basket. This is to ensure that the slug forming in the strainer basket can pass into the press basket without getting stuck in the radially outwardly region at steps or edges in the press basket.

These configurations allow the provision of manufacturing tolerances of the press basket considerably larger than the manufacturing tolerances of the strainer basket. This allows less expensive production of the press basket so as to considerably reduce manufacturing costs. This combination of increased manufacturing tolerances of the press basket and simultaneous enlargement of the inner diameter of the press basket ensures that despite increased manufacturing tolerances the press basket still has a larger inner diameter so as to prevent resistance as the slug passes from the strainer basket into the press basket. The prerequisites and conditions apply in analogy in particular to the wearing ring whose inner diameter preferably lies between the inner diameter of the strainer basket and the inner diameter of the press basket.

In particularly preferred configurations the housing comprises a filter housing and a press housing. The two housing parts, the filter housing and the press housing, may be interconnected by way of a flap cover mechanism.

In advantageous more specific embodiments a pipe or a pipe-like structure is mounted in the press housing axially subsequent to the worm shaft of the screw and extending in particular as far as the outlet or through the outlet to the exterior. The pipe or the pipe-like structure may consist of solid material or it may be configured hollow. In these configurations the worm shaft terminates within the housing with the worm shaft being axially extended in the axial direction by the pipe or a corresponding pipe-like structure. This configuration allows the hollow cylindrical slug to be reliably guided from the strainer basket through the wearing ring and through the press basket to the outlet through the mouth in the housing and to the exterior. The outer diameter of the pipe-like structure may change in the axial direction and in particular taper or else possibly increase.

The pipe or at least part of the pipe-like structure may be received rotatably. It is likewise possible for at least part of or the entire pipe to be fixed to the press housing. By way of such a pipe, wear to the screw separator is yet further reduced. The slug forming in the suspension typically does not rotate along with the screw or else at a very low speed. This means that a worm shaft extending through the slug continuously scrubs at the slug composed of abrasive materials such that the worm shaft wears down relatively fast in this region. Now, if a stationary pipe is inserted or a rotating but not rotatably driven pipe, the slug is only pushed over the stationary pipe. The pipe does not continuously rotate within the slug. The relative speeds occurring are considerably lower such that wear will be considerably lower as well. Durability increases.

In preferred configurations the flap cover mechanism is arranged at a front cover that can be swung or pivoted open. The front cover is in particular provided to be fastened via at least one quick release.

The front cover may comprise the press housing which is thus pivoted when being swung open so as to make the press basket which is mounted in the front cover or in the press housing readily accessible with the cover swung away. In this way simply swinging away the front cover allows to easily replace the press strainer and in particular the wearing ring. Although the wearing ring is preferably provided in the front cover it may be mounted in the remaining housing which may be referred to as a filter housing.

In all of the configurations at least one vibrating device may be provided which vibrating device in particular introduces vibrations into the feeder region of the screw separator. The vibrating device is configured such that its effect carries on at least as far as and into the inlet region of the strainer basket.

Preferably the vibrating device is arranged external of the feeder region. Specifically the vibrations of the vibrating device are transferable via supporting ribs or similar constructions to a vibrator located in the suspension. A membrane or the like may ensure that the interior is sealed. All the vibrating elements may be supported via springs or buffers or the like, moving correspondingly at least in the vertical and/or the horizontal direction.

In an alternative configuration of the separator according to the invention the screw separator for separating solids out of suspensions comprises at least one housing having at least one suspension feed pipe. At least one outlet for the separated liquid and at least one outlet for the at least partially dewatered solids are provided. At least one strainer basket is mounted in the filter housing in which at least one screw is rotatably provided. The screw vanes taper over at least one axial section of the screw in the radial direction.

This configuration again has considerable advantages. It is a specific advantage of screw vanes tapering over an axial section that stresses on the screw vanes and the strainer basket at the axial end of the screw vanes are reduced. This configuration allows for example for the screw vanes to extend in the axial direction as far as into the press basket wherein the region having the largest radial extension—viewed from the end—lies in the region of a wearing ring. Although in this configuration, viewed in the direction of the outlet, the screw vanes formally terminate in the axial direction behind the wearing ring but not in the wearing ring, the spot subjected to the largest stresses—in particular the axial end having the largest radial diameter—is located in the wearing ring. In this way the stresses on the strainer basket and on the press basket can be reduced correspondingly such that a wearing ring provided to be replaceable allows increased service lives of the strainer baskets and the screw vanes.

It is possible for the screw vanes to continuously taper over the axial section, or for the screw vanes to taper in one or more steps or the like in the axial direction.

BRIEF DESCRIPTION OF THE DRAWINGS

Other advantages and possibilities of application of the present invention can be taken from the exemplary embodiment which will be discussed below with reference to the accompanying figures.

These Show in.

DETAILED DESCRIPTION

Figure 1:
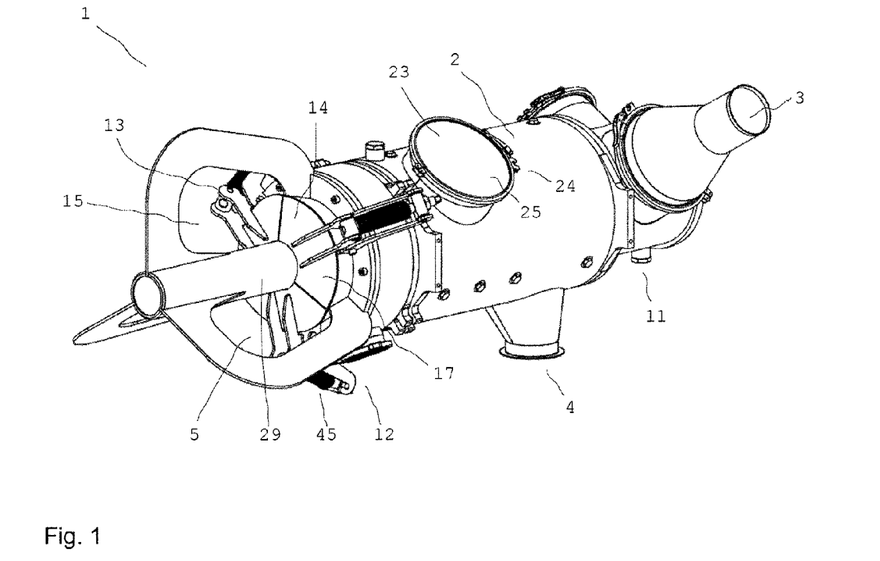
FIG. 1 a perspective view of an inventive screw separator in a closed position.

The screw separator 1 illustrated in FIG. 1 in a slightly perspective view in a closed state comprises a housing 2. The housing 2 is provided with a feed pipe 3 and with a discharge pipe 4 mounted in the lower region.

In the front region one can recognize the outlet 5 at the mouthpiece of the screw separator 1. The ejection controller 13 at the outlet 5 comprises a flap cover mechanism 14 configured as a spring flap cover mechanism comprising three cover sections 17 each being biased in the closed position 15 as illustrated in FIG. 1 by way of springs 45 such as disk springs or coil springs.

Unlike the illustrated embodiment the flap cover mechanism 14 may consist of four or five cover sections 17 each of which is separately biased in the closed position 15 by way of dedicated springs 45.

An inspection hole 23 provided with a cover that is for example configured as an inspection glass 25 and attached to the housing via a quick release 24 allows ready access to the interior of the screw separator 1. With the inspection hole 23 closed by an inspection glass 25, such inspection glass also permits inspecting the interior of the screw separator 1 during operation. In this way one can for example determine whether the filter screen of the strainer basket has clogged up with residue or the like.

In operation a suspension is filled into the feed pipe 3 to be separated by the screw separator 1 into liquid and solid constituents.

In operation a slug 35 will form (see FIG. 7) which is continuously moved towards the outlet 5 while new solid particles from the supplied suspension are continuously deposited at the rear end of the slug 35 thus forming a new slug.

Figure 2:
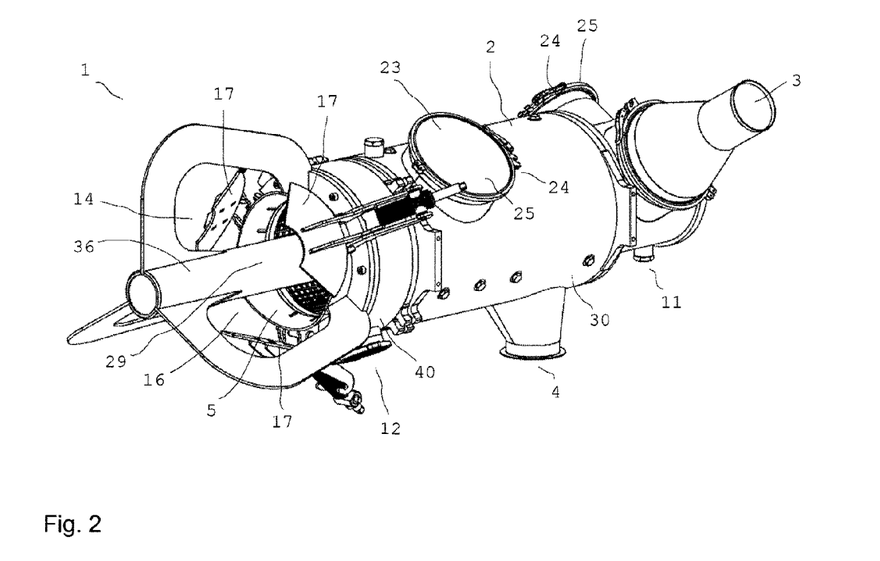
FIG. 2 the screw separator from FIG. 1 with the ejection controller in an open position.

In FIG. 2 the ejection controller 13 with the flap cover mechanism 14 is illustrated in an open position 16 in which for example the pressure from the slug 35 (not illustrated here) opens the cover sections 17 of the flap cover mechanism 14 against the spring force of the springs 45 such that the front part of the slug 35 is pushed out of the outlet.

Figure 3:
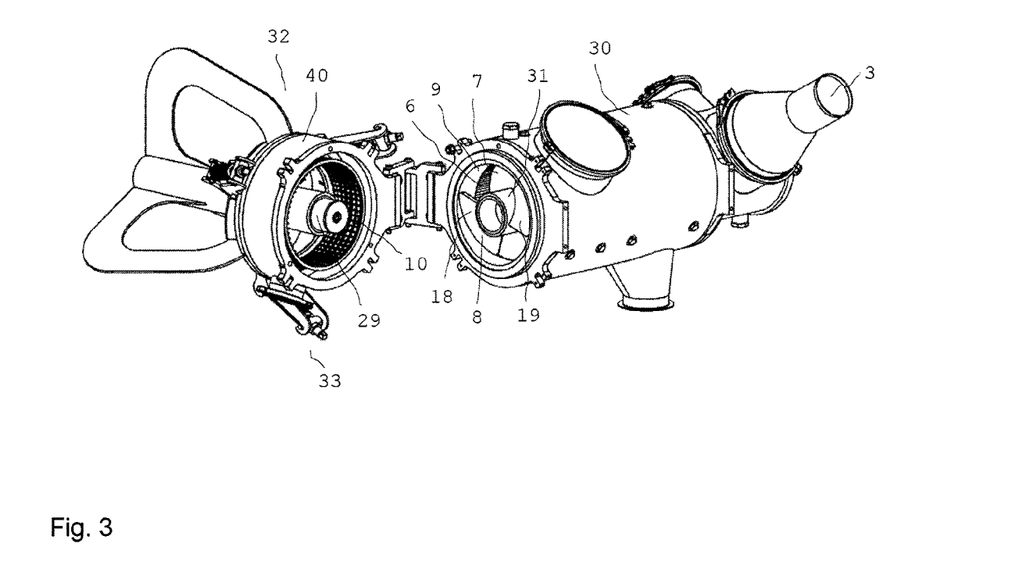
FIG. 3 the screw separator according to FIG. 1 with the front cover swung open.
Figure 4:
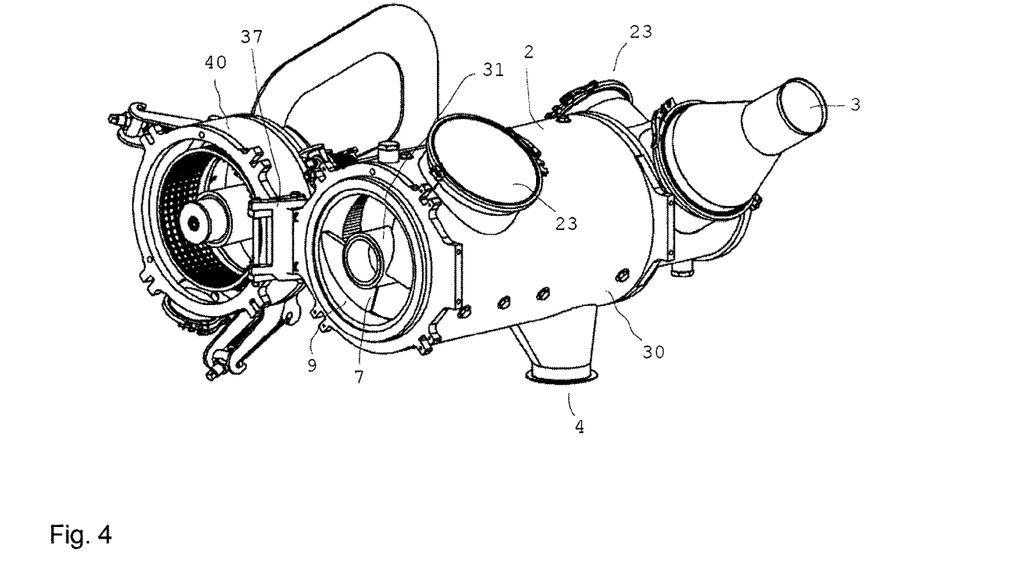
FIG. 4 the screw separator according to FIG. 1 with the front cover wide open.

In FIG. 3 the screw separator 1 is illustrated with the housing 2 partially opened and in FIG. 4, fully opened.

The housing 2 comprises the filter housing 30 and the press housing 40 which follows the filter housing 30 in the axial direction. It is clearly obvious that the two housing parts namely, the filter housing 30 and the press housing 40 which serves as the front cover 32, are interconnected via a hinge 37 which hinge 37 or swing mechanism comprises two or presently three pivoting axes parallel to one another such that the front cover 32 can be swung forwardly and then away to the side. The hinge 37 allows limited axial movement.

In the open position according to the FIGS. 3 and 4 the screw 7 is visible in the filter housing 30, being provided with screw vanes 8 in two screw flights 18 and 19 to thus provide a double-pitch screw 7.

In the axial direction the screw vanes 8 terminate in a separate ring or wearing ring 9 which is presently mounted at the front end of the filter housing 30 to be freely accessible. This enables ease of replacement for the wearing ring 9. Viewed from the feeder 3 towards the outlet 5, the strainer basket 6 lies in front of the wearing ring 9. The ring or wearing ring 9 may consist of plastic and/or fiber-reinforced materials, at least in part of a metal or a metal alloy, or else of wood and in particular hardwood.

In operation at least part of the liquid portion of the suspension emerges outwardly passing through the strainer basket that is configured as a filter screen and inside the filter housing 30 is diverted to the discharge 4.

The press housing 40 is fastened to the filter housing 30 by means of a quick release 33 or else several quick releases 33. For closing the housing 2 the front cover 32 is first swung towards the filter housing 30. In closing, the front tip of the pipe 29 or the pipe-like structure 36 enters the interior of the worm shaft 31 of the screw 7, thus guiding the worm shaft during operation.

The slug 35 forming in the filter housing 30 or slug 35 already having formed therein is presently hollow cylindrical in shape. The pipe 29 following the axial end of the worm shaft 31 stabilizes the interior of the slug 35. The fact that the outer diameter of the pipe 29 is matched to the outer diameter of the worm shaft 31 ensures ease of transition of the slug onto the pipe 29 in the press housing 40. The pipe 29 may likewise be configured slightly conically, tapering or widening in the axial direction.

In the press housing 40 the press basket 10 is provided through the filter surface of which the remaining squeezed-out liquid can emerge radially outwardly into the housing 2 before the slug 35 emerges outwardly through the front mouthpiece or the outlet 5. The separated solids can then be put to suitable use.

Figure 5:
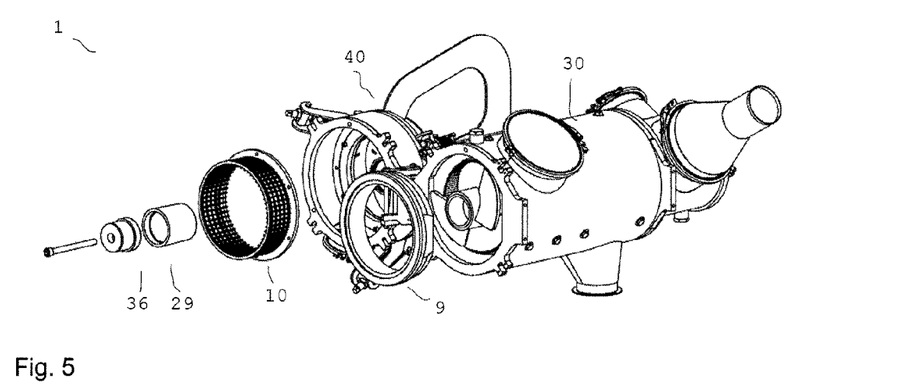
FIG. 5 the screw separator according to FIG. 1 with some of the components removed in an exploded view.

FIG. 5 shows a schematic exploded view of the screw separator 1 in an open position. One can clearly recognize the wearing ring 9 mounted axially in front of the filter housing

30. In front of the press housing 40 the press basket 10 and the pipe 29 or the pipe-like structure 36 is illustrated which serves as an axial extension of the worm shaft 31.

Figure 6:
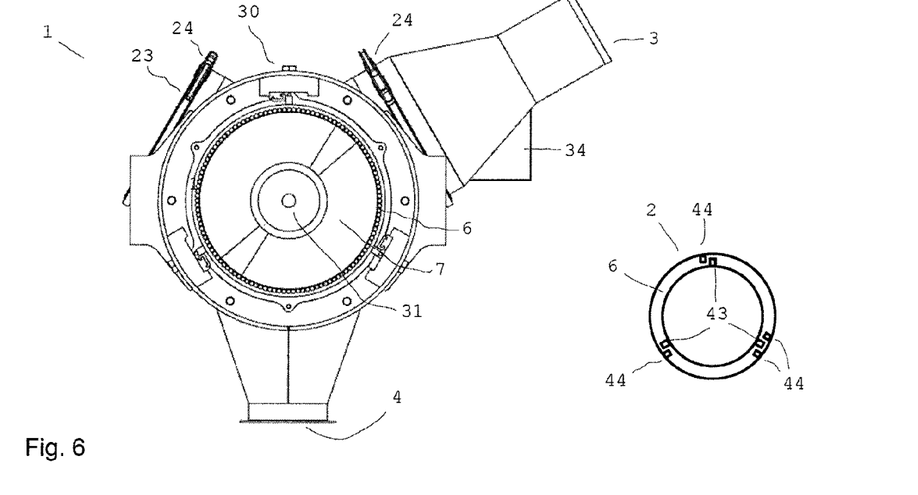
FIG. 6 a front view of the filter housing of the screw separator according to FIG. 1 and a schematic cross-section.

FIG. 6 shows a front view of the filter housing 30 allowing a look into the interior of the screw separator 1. The suspension supplied through the feed pipe 3 arrives in the feeder region 38 (see FIG. 8) and by means of the screw 7 is conveyed forwardly in the direction of the outlet 5.

The worm shaft 7 carries the screw vanes 8 and is guided tight in the strainer basket 6. The strainer basket 6 is configured as a filter screen, comprising rods arranged over the periphery in parallel in the longitudinal direction and spaced apart by gaps in the peripheral direction between about 1 and 2 mm. The exact gap size depends on the intended application and may be smaller or larger in relation to the materials to be separated.

Over the outer periphery of the strainer basket 6 three rods 43 are distributed symmetrically, being secured to the strainer basket 6 and providing a radially floating support of the strainer basket 6 and preventing the strainer basket 6 from rotating along with the screw 7. To this end a total of four rods 44 are presently provided in the housing 2 serving as retaining means to prevent the strainer basket 6 from rotating along with the screw 7. The arrangement principle of the rods 43 and 44 is shown in the schematic cross-section on the right in FIG. 6. One rod 43 of the strainer basket is provided on both sides with rails or rods 44 in the filter housing while only one rod 44 each is provided in the housing for the other rods 43. Since the screw 7 will always only rotate in one direction it is sufficient to provide two rods in the filter housing 2 for one rod 43 only. The strainer basket 6 is radially movable in the housing 2 by about 2 mm such that the strainer basket can adjust to occurring stresses.

One or more inspection holes 23 may be provided in different places with transparent or non-transparent covers.

The feed pipe 3 or the feeder region 38 may be provided with a vibrating device 34 to intentionally introduce vibrations into the suspension or matter contained to achieve homogeneity of distribution and high efficiency of the screw separator 1.

Figure 7:
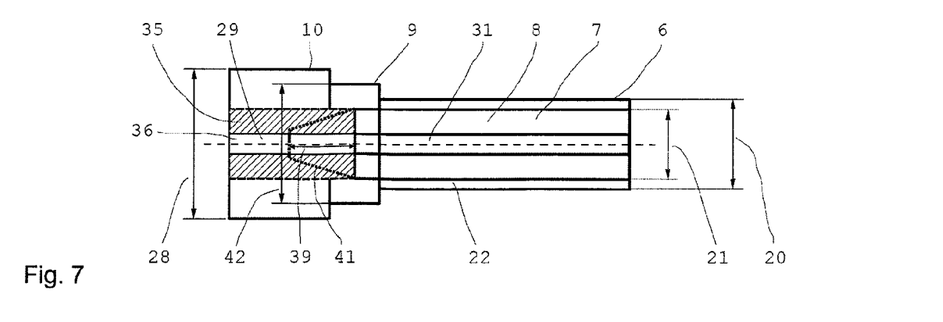
FIG. 7 a schematic longitudinal cross-section of another screw separator.

FIG. 7 shows a simplistic and in particular not true to scale cross-sectional view of a screw separator 1. The illustration in FIG. 7 shows in a highly magnified scale that the inner diameter 28 of the press basket is larger than the inner diameter 42 of the wearing ring 9 which in turn is larger than the inner diameter 20 of the strainer basket 6. The fact that each subsequent component is somewhat larger in its inner diameter than the preceding component allows to ensure that the slug 35 passes unobstructed from one component to the next.

This construction in particular allows considerably increasing the manufacturing tolerances for the press basket 10 so as to largely simplify manufacturing and reduce costs. The dimensions of the wearing ring 9 and of the press basket 10 ensure that their inner diameters are larger than is the inner diameter 20 of the strainer basket 6.

The pipe-like structure 36 or the pipe 29 inside the slug 35 stabilizes the slug, preventing it from collapsing. The pipe 29 is in particular configured stationary so as to quite considerably reduce wear on the pipe 29. In conventional screw separators in which the worm shaft 31 extends to the exterior through the mouthpiece beyond the press basket, the pipe continuously rotates with the slug 35 that virtually does not rotate along.

In a conventional screw separator 1 the relative speed between the outside of the worm shaft 31 and the slug 35, given a worm shaft diameter of approximately 10 cm and a rotational speed of approximately 30 revolutions/minute, is roughly estimated 15 cm/second. In this example the advance rate of the slug is approximately 1 cm/second. This means that the relative speed between the slug 35 and the worm shaft 31 is a combination of the advance rate of 1 cm/second and the relative rotational speed of approximately 5 cm/second. For the screw separator 1 the relative speed between the slug 35 and the pipe 29 in the press basket 10 is approximately 1 cm/second thus corresponding to the advance rate of the slug 35 since the pipe is mounted stationary. In the region of the press basket 10 the stresses are highest since this is where the highest pressures occur. By means of this measure, wear can be reduced quite considerably.

The additional dotted line denotes a cone section 41 of another configuration of a screw 7 where the screw vanes 8 are radially tapering over an axial section 39. Here the largest radial diameter lies in the region of the ring 9. The axial section 39 over which the screw vanes radially taper may extend as far as and into the press basket 10. Then the worm shaft 31 extends as far as the edges of the screw vanes 8. A suitable pipe 29 may be axially mounted at the rear of the worm shaft 31. In this configuration of the screw vanes 8, also shown in a dotted line, the region of maximum stress again lies within the wearing ring 9. This configuration allows for the screw vanes to formally extend as far as into the press basket 10 while the stresses within the press basket 10 are concurrently reduced so as to increase durability. A stepped tapering is in particular conceivable.

The radial gap 22 between the outer diameter 21 of the screw vanes 8 and the inner diameter 20 of the strainer basket is intentionally small, for example 0.5 mm, while the outer diameter of the screw vanes may be 20 cm, 25 cm, or even 30 cm. This very narrow gap prevents water or the suspension from spurting forwardly which would interfere with slug formation. Furthermore the screw vanes 8 continuously free the strainer basket 6 interior from residues, thus preventing clogging up.

Figure 8:
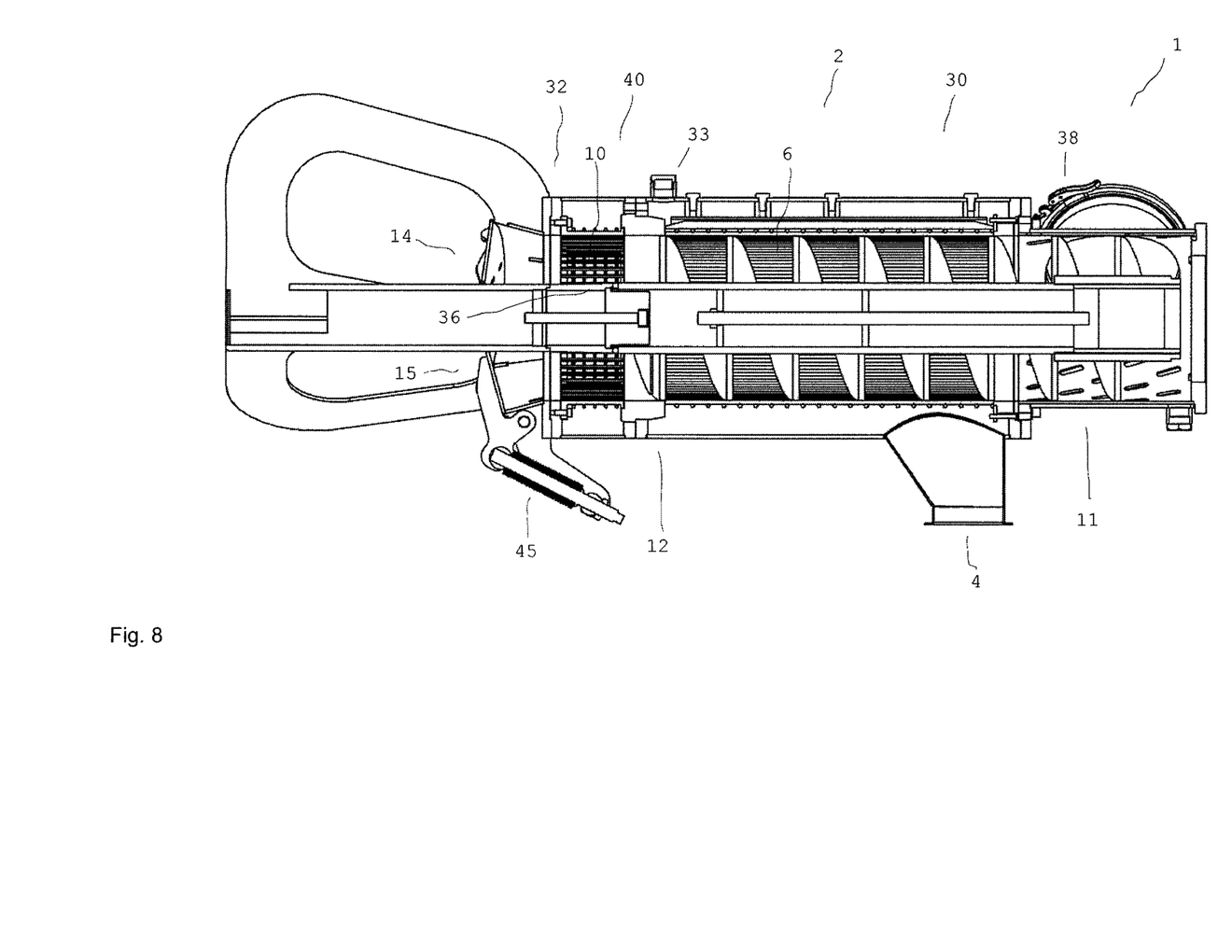
FIG. 8 a cross-section of the screw separator according to FIG. 1.

FIG. 8 shows a longitudinal cross-section of the screw separator 1. The suspension to be separated is fed to the feeder region 38 from where it is conveyed towards the strainer basket 6 by means of the screw vanes 8.

In the axially and radially floating strainer basket 6 the suspension charge is continuously compacted to thus form a slug 35 from the solids contained while the aqueous constituents run outwardly through the strainer basket 6 at least in part, draining off through the discharge 4. The screw vanes 8 terminate in the axial direction in a wearing ring 9 that is provided as a replaceable part.

The screw 7 is rotatably supported on the feeder side 11 and at its free end 12 it is guided by the pipe-like structure 36. It is as well conceivable to support the screw 7 at both ends.

The housing 2 consists of the filter housing 30 and the press housing 40 which is provided as a front cover 32 that can be swung away.

The front cover 32 is provided with a flap cover mechanism 14, presently having three cover sections 17 that are biased in the closed position via springs 45.

A pipe-like structure 36 is also retained in the front cover 32 configured as a hollow or else a solid pipe 29 which when closed axially follows the end of the worm shaft 31 which it guides.

On the whole the invention provides a screw separator which ensures high functional reliability, high durability, and reliable operation while also offering ease of maintenance.

Due to a separate ring 9 being provided between the strainer basket 6 which serves as a dewatering screen and the press basket 10 in which the effective portion of the screw vanes 8 terminates, the strainer basket 6 is subjected to reduced wear so as to achieve increased durability. This is again supported by the fact that the strainer basket 6 is received in the housing 2 to be radially floating while the press basket 10 is axially and radially fixed in the housing 2.

Another considerable advantage is the separate construction of the pipe 29 which axially follows the worm shaft 31 that terminates inside the housing 2. For one the pipe 29 ensures that the slug 35 retains stability inside the press basket 10 and for another the pipe 29 received in particular stationary considerably reduces wear on the worm shaft 31.

On the whole a screw separator 1 offering flexible applications is provided which achieves high durability at low operational costs.

While a particular embodiment of the present screw separator has been described herein, it will be appreciated by those skilled in the art that changes and modifications may be made thereto without departing from the invention in its broader aspects and as set forth in the following claims.

The invention claimed is:

1. A screw separator for separating solids out of suspensions, comprising:
   at least one housing and at least one feed pipe for a suspension, at least one discharge pipe for liquids, and at least one outlet for at least partially dewatered solids;
   at least one strainer basket in the at least one housing;
   at least one press basket mounted downstream of the at least one strainer basket;
   a screw including screw vanes rotatably mounted in the at least one housing, said screw vanes being directly adjacent to and terminating in a replaceable wearing ring mounted between the at least one strainer basket and the at least one press basket, wherein said replaceable wearing ring is in contact with the suspension, and wherein an inner diameter of said at least one press basket is larger than an inner diameter of said replaceable wearing ring, and said inner diameter of said replaceable wearing ring is larger than an inner diameter of said at least one strainer basket.

2. The screw separator according to claim 1, wherein the replaceable wearing ring is configured to be tight in a radial direction.

3. The screw separator according to claim 1, wherein the screw is guided at its free end.

4. The screw separator according to claim 1, wherein the at least one outlet includes at least one ejection controller.

5. The screw separator according to claim 1, wherein a flap cover mechanism provided on the at least one outlet comprises at least three flap cover sections which are distributed over a circumference of the at least one outlet.

6. The screw separator according to claim 1, wherein the at least one strainer basket is retained in the at least one housing radially floating.

7. The screw separator according to claim 1, wherein an inner diameter of the at least one strainer basket is adapted to an outer diameter of the screw.

8. The screw separator according to claim 1, wherein the at least one strainer basket is retained radially fixed.

9. The screw separator according to claim 1, wherein the at least one strainer basket is retained axially floating.

10. The screw separator according to claim 1, wherein the at least one housing comprises a filter housing and a press housing.

11. The screw separator according to claim 10, wherein a cylindrical structure is mounted in the press housing axially following a worm shaft of the screw and extends outwardly through the at least one outlet.

12. The screw separator according to claim 11, wherein at least part of the cylindrical structure is received rotatably.

13. The screw separator according to claim 11, wherein at least part of the cylindrical structure is received stationary.

14. The screw separator according to claim 1, wherein a flap cover mechanism is arranged on a front cover which can be swung or pivoted away.

15. The screw separator according to claim 1, further comprising at least one vibrating device, wherein vibrations are introduced into a filling space of the screw separator by means of the at least one vibrating device such that the vibrations carry into an inlet region of the at least one strainer basket.

16. The screw separator according to claim 15, wherein the at least one vibrating device is mounted externally of the filling space and the vibrations of the at least one vibrating device are transferable via supporting ribs to a vibrator located in the suspension, wherein a membrane ensures that an interior is sealed and all vibrating elements are supported by one of springs or rubber buffers, allowing movement at least in a vertical direction.

17. A screw separator for separating solids out of suspensions, comprising:
   at least one housing and at least one feed pipe for a suspension, at least one discharge pipe for liquids, and at least one outlet for at least partially dewatered solids;
   at least one strainer basket in the at least one housing;
   at least one press basket mounted downstream of the at least one strainer basket;
   a screw including a plurality of screw vanes is rotatably mounted in the at least one housing, wherein the plurality of screw vanes radially taper over at least an axial section of the screw and are directly adjacent to and terminate in a replaceable wearing ring mounted between the at least one strainer basket and the at least one press basket, wherein said replaceable wearing ring is in contact with the suspension, and wherein an inner diameter of said at least one press basket is larger than an inner diameter of said replaceable wearing ring, and said inner diameter of said replaceable wearing ring is larger than an inner diameter of said at least one strainer basket.

18. The screw separator according to claim 17, wherein the plurality of screw vanes taper towards an outlet end of the at least one housing.

19. The screw separator according to claim 17, wherein the plurality of screw vanes taper in steps over the at least an axial section.

20. The screw separator according to claim 17, wherein the plurality of screw vanes taper continuously over the at least an axial section.

\* \* \* \* \*